Patented Aug. 16, 1927.

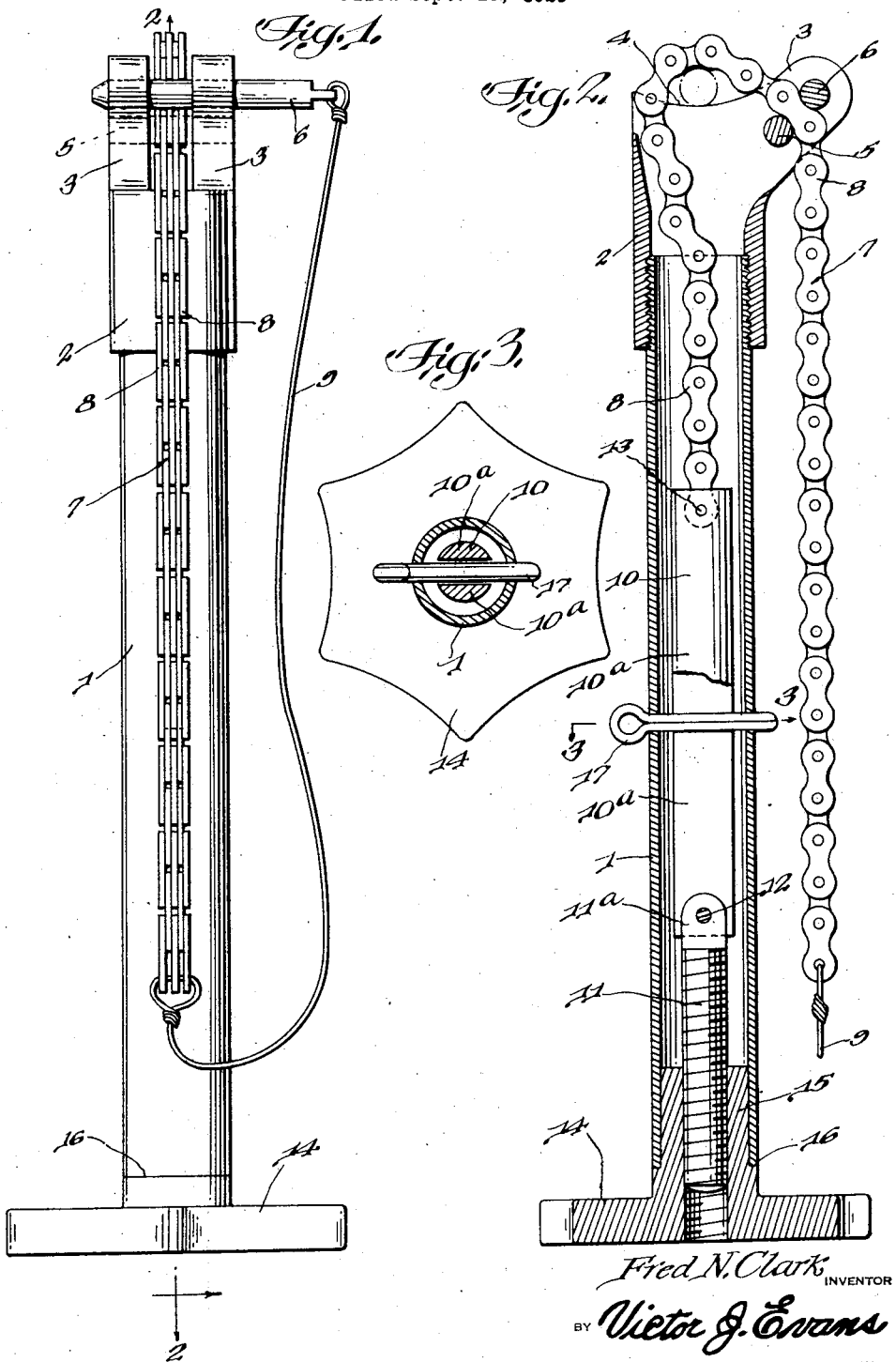

1,638,918

UNITED STATES PATENT OFFICE.

FRED N. CLARK, OF HAMMOND, INDIANA.

WIRE CLAMP.

Application filed September 18, 1925. Serial No. 57,245.

This invention relates to clamping devices and more particularly to a wire clamp for holding cables formed of strands of wire braided together or for holding a plurality of strands of wire to be braided together to form a cable.

One of the main objects of the invention is to provide a clamp of simple construction and operation by means of which a cable formed of a plurality of strands of wire can be tightly secured for splicing or other purposes or, if desired, a plurality of strands of wire can be tightly secured so as to be twisted or braided together for forming a cable. A further object is to provide a clamp of this character consisting of few parts, which can be readily produced at comparatively small cost, and is simple and efficient in operation. Further objects will appear from the detailed description.

In the drawings:

Fig. 1 is an elevation of the clamp.

Fig. 2 is a section taken substantially on line 2—2 of Fig. 1, parts being shown in elevation.

Fig. 3 is a section taken substantially on line 3—3 of Fig. 2.

The clamp includes a barrel 1 upon one end of which is secured a head 2, this head being provided with a bore which is aligned with the bore of the barrel. The outer end of the head is shaped to form angularly disposed arms 3 arranged in spaced parallel relation, the outer faces of these arms being concave to provide arcuate surfaces 4, the central or deeper portions of which are disposed centrally and diametrically of head 2. The short pin 5 is secured through arms 3 a slight distance beyond the main or body portion of head 2 and cooperates with a securing pin 6 for securing between the arms a flexible member such as a chain 7, the plates 8 of the links of which are of less width at their central portions than at their ends providing an arcuate depression for reception of the securing pin, arms 3 being provided with aligned openings for reception of the pin. For convenience pin 6 is secured by means of a cord or flexible wire 9 to the free end of chain 7. The other end of chain 7 is secured to the inner end of a spindle 10 which is freely movable in barrel 1 longitudinally thereof. This spindle is formed of two sections or plates 10ª and the flattened inner end portion 11ª of a screw 11 is secured between the outer ends of these plates by means of the rivet 12 or in any other suitable or preferred manner. The other end of chain 7 is secured between the inner ends of the plates 10ª by means of a rivet 13 or in any other suitable or preferred manner. A hand wheel 14 is provided with a reduced neck 15 which fits snugly into the other end of barrel 1, this wheel being bored and threaded for engagement with screw 11. The wheel is further provided with an outer annular shoulder 16 which bears against the end of the barrel. By turning the wheel in the proper direction screw 11 is drawn outwardly through the wheel thus moving spindle 10 away from the head 2 so as to draw chain 7 tightly about the cable or a plurality of strands of wire inserted between the chain and the outer end of the head. During this operation the spindle is preferably held against turning movement by means of a cotter pin 17 or other suitable device inserted through aligned openings through barrel 1 and passing between plates 10ª of the spindle.

In using the clamp, the cable or wires to be secured are placed across the outer end of head 2, chain 7 being cast over the cable or wires and secured to arms 3 by means of the pins 5 and 6. After the chain has thus been secured wheel 14 is turned so as to force screw 11 through the wheel in proper direction to tension the chain and tightly grip the object between the chain and the concave surfaces 4 of arms 3. This provides a very simple and highly efficient tool by means of which objects of various sizes and shape can be quickly and easily clamped and securely held to be operated upon.

What I claim is:

In a device of the class described including a barrel, a head member secured at one end of said barrel with bore therein in registry with the bore of the barrel, a hand wheel with threaded bore and reduced neck portion for rotatable positionment at the opposite end of said barrel, a split spindle member positioning within said barrel and having a pin member therethrough for limiting longitudinal movement of said spindle, a screw shank secured to said split spindle for threaded engagement with said hand wheel, and a flexible element secured at the opposite end of said spindle terminating through the bore of the head with means for adjustably securing to said head, substantially as shown.

In testimony whereof I affix my signature.

FRED N. CLARK.